United States Patent
Li et al.

(10) Patent No.: US 12,339,122 B2
(45) Date of Patent: Jun. 24, 2025

(54) PASSIVE COMBINED INDOOR POSITIONING SYSTEM AND METHOD BASED ON INTELLIGENT TERMINAL SENSOR

(71) Applicant: China University of Mining and Technology, Xuzhou (CN)

(72) Inventors: Zengke Li, Xuzhou (CN); Kefan Shao, Xuzhou (CN); Shiyi Jing, Xuzhou (CN); Yanlong Liu, Xuzhou (CN); Qi Wu, Xuzhou (CN); Ao Liu, Xuzhou (CN); Xingyu Ding, Xuzhou (CN)

( * ) Notice: Subject to any disclaimer, the term of this patent is extended or adjusted under 35 U.S.C. 154(b) by 314 days.

(21) Appl. No.: 18/151,633

(22) Filed: Jan. 9, 2023

(65) Prior Publication Data

US 2023/0304802 A1 Sep. 28, 2023

(30) Foreign Application Priority Data

Mar. 22, 2022 (CN) .......................... 202210285267.4

(51) Int. Cl.
*G01C 21/16* (2006.01)
*G01C 21/20* (2006.01)

(52) U.S. Cl.
CPC ....... *G01C 21/188* (2020.08); *G01C 21/1654* (2020.08); *G01C 21/206* (2013.01)

(58) Field of Classification Search
CPC .......................... G01C 21/188; G01C 21/1654; G01C 21/206; G01C 21/08; G01C 21/12; G01C 22/006; G01C 21/005; G01C 21/165; Y02D 30/70
See application file for complete search history.

(56) References Cited

U.S. PATENT DOCUMENTS

| | | | |
|---|---|---|---|
| 10,502,576 B2 * | 12/2019 | Trigoni | G01C 21/12 |
| 11,783,258 B2 * | 10/2023 | Xiao | H04W 4/029 |
| | | | 701/469 |
| 12,078,510 B2 * | 9/2024 | Zhu | G01C 21/3841 |
| 2018/0283882 A1 * | 10/2018 | He | H04L 67/30 |
| 2021/0262800 A1 * | 8/2021 | Levine | G06F 3/012 |
| 2024/0271938 A1 * | 8/2024 | Ren | G06N 3/044 |

\* cited by examiner

*Primary Examiner* — Aniss Chad
*Assistant Examiner* — Christopher George Fees
(74) *Attorney, Agent, or Firm* — Sandy Upkin (57) ABSTRACT

A passive combined indoor positioning system and method based on an intelligent terminal sensor, and is applied to the technical field of real-time positioning, can include a data collection module, a dead reckoning module, a geomagnetic matching determining module, a single-point matching module, a sequence matching module, a single-point positioning module, a sequence positioning module, and an error correction module. The system collects sensor data of a current location by using an intelligent terminal, and performs dead reckoning and geomagnetic matching based on the sensor data of the current location, so as to obtain a fusion positioning result of the current location through particle filter.

2 Claims, 6 Drawing Sheets

PASSIVE COMBINED INDOOR POSITIONING SYSTEM AND METHOD BASED ON INTELLIGENT TERMINAL SENSOR

CROSS REFERENCE TO RELATED APPLICATION

This patent application claims the benefit and priority of Chinese Patent Application No. 202210285267.4, filed with the China National Intellectual Property Administration on Mar. 22, 2022, the disclosure of which is incorporated by reference herein in its entirety as part of the present application.

TECHNICAL FIELD

The present disclosure relates to the technical field of real-time positioning, and in particular, to a passive combined indoor positioning system and method based on an intelligent terminal sensor.

BACKGROUND

An indoor positioning technology is widely used in intelligent storage, smart logistics, wise information technology of med (WITMED), and other scenarios. Based on the current scientific and technological development, indoor positioning based on an intelligent terminal will become an inevitable trend in future life and work.

At present, indoor positioning technologies based on the intelligent terminal mainly include Bluetooth, wireless fidelity (WiFi), cellular networks, pedestrian dead reckoning (PDR), and the like. The Bluetooth and WiFi technologies send a signal based on location-known access points (AP) for positioning. Their positioning accuracy is affected by an indoor environment and a pedestrian, and their anti-multipath capabilities are weak. A large number of base stations need to be deployed in advance to achieve expected positioning accuracy. The cellular network can perform positioning by using operator's communication base stations, but has low positioning accuracy due to an impact of a non-line of sight (NLOS) environment in an urban environment. The PDR technology recursively reckons a location based on an inertia sensor in the intelligent terminal, which achieves high accuracy in a short time, but a positioning error will accumulate with time and a moving distance.

SUMMARY

The present disclosure is intended to provide a passive combined indoor positioning system and method based on an intelligent terminal sensor and a particle filter, so as to suppress error accumulation of PDR, improve continuity and reliability of positioning, and achieve wide application.

To achieve the above objective, the present disclosure provides the following technical solutions:

a passive combined indoor positioning system based on an intelligent terminal sensor includes:

a data collection module configured to collect sensor data of a current location, where the sensor data includes geomagnetic data, angular velocity data, and acceleration data, and the current location is an indoor location of an intelligent terminal of a target user at a current time point;

a dead reckoning module configured to detect a gait of the target user based on an acceleration peak threshold, a time threshold, and the acceleration data in the sensor data of the current location, estimate a step length of the target user based on a step length regression model at the current time point, estimate a step orientation of the target user based on the sensor data of the current location and a step orientation error at the current time point, and perform dead reckoning based on a gait detection result, a step length estimation result, and a step orientation estimation result to obtain a current dead reckoning result of the target user, where the step length regression model is constructed based on a step frequency of the target user and an acceleration inertia integration result;

a geomagnetic matching determining module configured to determine a candidate fingerprint database based on the current dead reckoning result, and input geomagnetic data of each location in the candidate fingerprint database into a geomagnetic information abundance evaluation model, such that the geomagnetic information abundance evaluation model outputs a geomagnetic matching weight determining mode of the geomagnetic data of each particle in the candidate fingerprint database, where the geomagnetic matching weight determining mode includes single-point matching and sequence matching;

a single-point matching module configured to determine coordinates and a weight of each particle in the candidate fingerprint database based on the geomagnetic data in the sensor data of the current location and the geomagnetic data of each particle in the candidate fingerprint database when the geomagnetic matching weight determining mode is the single-point matching;

a sequence matching module configured to match geomagnetic data of a current sequence segment (i.e., particle) with geomagnetic data of each fingerprint segment in a geomagnetic fingerprint database to obtain coordinates and a weight of each fingerprint segment when the geomagnetic matching weight determining mode is the sequence matching, where the current sequence segment includes magnetic data in a time period from a set time point to the current time point, the set time point is any time point before the current time point, and a length of the fingerprint segment is equal to a length of the current sequence segment;

a single-point positioning module configured to determine a final positioning result of the current particle based on the coordinates and the weight of each particle in the candidate fingerprint database when the geomagnetic matching weight determining mode is the single-point matching;

a sequence positioning module configured to determine the final positioning result of the current location based on the coordinates and the weight of each fingerprint segment when the geomagnetic matching weight determining mode is the sequence matching; and an error correction module configured to correct the step length regression model and step orientation error at the current time point based on the final positioning result of the current location, use a corrected step length regression model as a step length regression model at a next time point, correct the step orientation error at the current time point based on a step orientation estimation result at the current time point and the step orientation estimation result back calculated based on adjacent time point fusion positioning results at the current time point, and use a corrected step orientation error as a step orientation error at the next time point.

Optionally, the passive combined indoor positioning system further includes:
a data storage module configured to determine and store the geomagnetic information abundance evaluation model based on coordinates and geomagnetic data of each indoor location.

Optionally, the data storage module includes:
a geomagnetic fingerprint database construction unit configured to construct the geomagnetic fingerprint database based on the coordinates and the geomagnetic data of each indoor location;
a region division unit configured to divide the geomagnetic fingerprint database into a plurality of sub-regions;
a geomagnetic information evaluation unit configured to extract a five-dimensional geomagnetic feature of the sub-region and an indicator of the geomagnetic feature of each dimension, take the indicator of the five-dimensional geomagnetic feature as an input of a deep learning network, train the deep learning network by taking the corresponding geomagnetic matching weight determining mode as an output, and determine a trained deep learning network as the geomagnetic information abundance evaluation model; and a geomagnetic map storage unit configured to store the geomagnetic information abundance evaluation model.

Optionally, the dead reckoning module includes:
a gait detection unit configured to detect the gait of the target user based on the acceleration peak threshold, the time threshold, and the acceleration data in the sensor data of the current location to obtain the gait detection result of the target user;
a step length estimation unit configured to estimate the step length of the target user based on the step length regression model at the current time point to obtain the step length estimation result of the target user;
a step orientation estimation unit configured to determine a posture of the target user at the current time point based on the geomagnetic data, the acceleration data, and the angular velocity data in the sensor data of the current location, and determine the step orientation estimation result of the target user based on the posture at the current time point; and a dead reckoning unit configured to perform dead reckoning based on the gait estimation result, the step length estimation result, and the step orientation estimation result to obtain the current dead reckoning result.

Optionally, the geomagnetic matching determining module includes:
a candidate fingerprint database determining unit configured to determine the candidate fingerprint database by taking the current dead reckoning result as a center and a specified radius as a constraint, where the specified radius is a multiple of the step length estimation result; and
a matching mode determining unit configured to input the geomagnetic data of each location in the candidate fingerprint database into the geomagnetic information abundance evaluation model, such that the geomagnetic information abundance evaluation model outputs the geomagnetic matching weight determining mode of the geomagnetic data of each particle in the candidate fingerprint database.

Optionally, the sequence matching module includes:
a sequence composition unit configured to extract a plurality of single point fingerprints to form a sequence fingerprint from the geomagnetic fingerprint database based on the length of the current sequence segment; and
a sequence geomagnetic matching unit configured to perform similarity matching on the geomagnetic data of the current sequence segment and the geomagnetic data of each fingerprint segment to obtain the coordinates and the weight of each fingerprint segment.

Optionally, the single-point positioning module includes:
a single-point weight resampling unit configured to perform clustering and rationality verification on the weight of each particle in the candidate fingerprint database, and resample a weight and corresponding coordinates of each particle obtained after the clustering and rationality verification in a candidate fingerprint database to obtain a first type of resampled data; and
a single-point positioning combination unit configured to perform weighted averaging on the first type of resampled data to obtain the final positioning result of the current location.

Optionally, the sequence positioning module includes:
a sequence weight resampling unit configured to perform clustering and rationality verification on the weight of each fingerprint segment, and resample a weight and corresponding coordinates of each fingerprint segment obtained after the clustering and rationality verification to obtain a second type of resampled data; and
a sequence positioning combination unit configured to perform weighted averaging on the second type of resampled data to obtain the final positioning result of the current location.

A passive combined indoor positioning method based on an intelligent terminal sensor includes:
obtaining sensor data of a current location, where the sensor data includes geomagnetic data, angular velocity data, and acceleration data, and the current location is an indoor location of an intelligent terminal of a target user at a current time point;
detecting a gait of the target user based on an acceleration peak threshold, a time threshold, a step length regression model at the current time point, and the sensor data of the current location, estimating a step length and a step orientation of the target user, and performing dead reckoning based on a gait detection result, a step length estimation result, and a step orientation estimation result to obtain a current dead reckoning result of the target user, where the step length regression model is constructed based on a step frequency of the target user and an acceleration inertia integration result;
determining a candidate fingerprint database based on the current dead reckoning result, and inputting geomagnetic data of each location in the candidate fingerprint database and the geomagnetic data in the sensor data of the current location into a geomagnetic information abundance evaluation model, such that the geomagnetic information abundance evaluation model outputs a geomagnetic matching weight determining mode of the geomagnetic data of each particle in the candidate fingerprint database and a geomagnetic matching weight determining mode of the geomagnetic data in the sensor data of the current location, where the geomagnetic matching weight determining mode includes single-point matching and sequence matching;
determining coordinates and a weight of each particle in the candidate fingerprint database based on the geomagnetic data in the sensor data of the current location and the geomagnetic data of each particle in the candidate fingerprint database when the geomagnetic matching weight determining mode is the single-point matching;

matching geomagnetic data of a current sequence segment with geomagnetic data of each fingerprint segment in a geomagnetic fingerprint database to obtain coordinates and a weight of each fingerprint segment when the geomagnetic matching weight determining mode is the sequence matching, where the current sequence segment includes magnetic data in a time period from a set time point to the current time point, the set time point is any time point before the current time point, and a length of the fingerprint segment is equal to a length of the current sequence segment;

determining a final positioning result of the current particle based on the coordinates and the weight of each particle in the candidate fingerprint database when the geomagnetic matching weight determining mode is the single-point matching;

determining the final positioning result of the current location based on the coordinates and the weight of each fingerprint segment when the geomagnetic matching weight determining mode is the sequence matching; and correcting the step length regression model and the step orientation at the current time point based on the final positioning result of the current location, using a corrected step length regression model as a step length regression model at a next time point, correcting a step orientation error at the current time point based on a step orientation estimation result at the current time point and the step orientation estimation result back calculated based on adjacent time point fusion positioning results at the current time point, and using a corrected step orientation error as a step orientation error at the next time point.

Optionally, the passive combined indoor positioning method further includes:

determining and storing the geomagnetic information abundance evaluation model based on coordinates and geomagnetic data of each indoor location.

According to the specific embodiments provided by the present disclosure, the present disclosure provides the following technical effects:

The present disclosure provides a passive combined indoor positioning system and method based on an intelligent terminal sensor. The passive combined indoor positioning system performs dead reckoning based on collected sensor data of a current location, determines a candidate fingerprint database based on a dead reckoning result, and determines a geomagnetic matching weight determining mode by using a geomagnetic information abundance evaluation model based on geomagnetic data in the determined candidate fingerprint database; when the geomagnetic matching weight determining mode is single-point matching, determines coordinates and a weight of each particle in the candidate fingerprint database based on geomagnetic data of each particle in the candidate fingerprint database and geomagnetic data in the sensor data of the current location, so as to determine a final positioning result of the current location; when the geomagnetic matching weight determining mode is sequence matching, forms geomagnetic fingerprints from a plurality of single point fingerprints to form a sequence fingerprint based on a length of a current sequence segment, and determines coordinates and a weight of each fingerprint segment based on geomagnetic data of the current sequence segment and geomagnetic data of each fingerprint segment in the geomagnetic fingerprint database, so as to determine the final positioning result of the current location; and before positioning a next location, corrects a step length regression model at a current time point and a step orientation error at the current time point based on the fusion positioning result of the current location, and uses a corrected step length regression model and a corrected step orientation error as a step length regression model and a step orientation error at a next time point respectively. This resolves a problem that a positioning error accumulates with time and a moving distance in an existing PDR-based positioning scheme.

BRIEF DESCRIPTION OF THE DRAWINGS

To describe the embodiments of the present disclosure or the technical solutions in the related art more clearly, the accompanying drawings required in the embodiments are briefly introduced below. Obviously, the accompanying drawings described below are only some embodiments of the present disclosure. A person of ordinary skill in the art may further obtain other accompanying drawings based on these accompanying drawings without creative labor.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

The present disclosure is intended to provide a passive combined indoor positioning system and method based on an intelligent terminal sensor, to combine PDR and geomagnetic matching through a particle filter, which not only suppresses error accumulation of the PDR, but also improves continuity and reliability of positioning, and achieves wide application.

To make the above-mentioned objective, features, and advantages of the present disclosure clearer and more comprehensible, the present disclosure will be further described in detail below in conjunction with the accompanying drawings and specific implementations.

Figure 1:
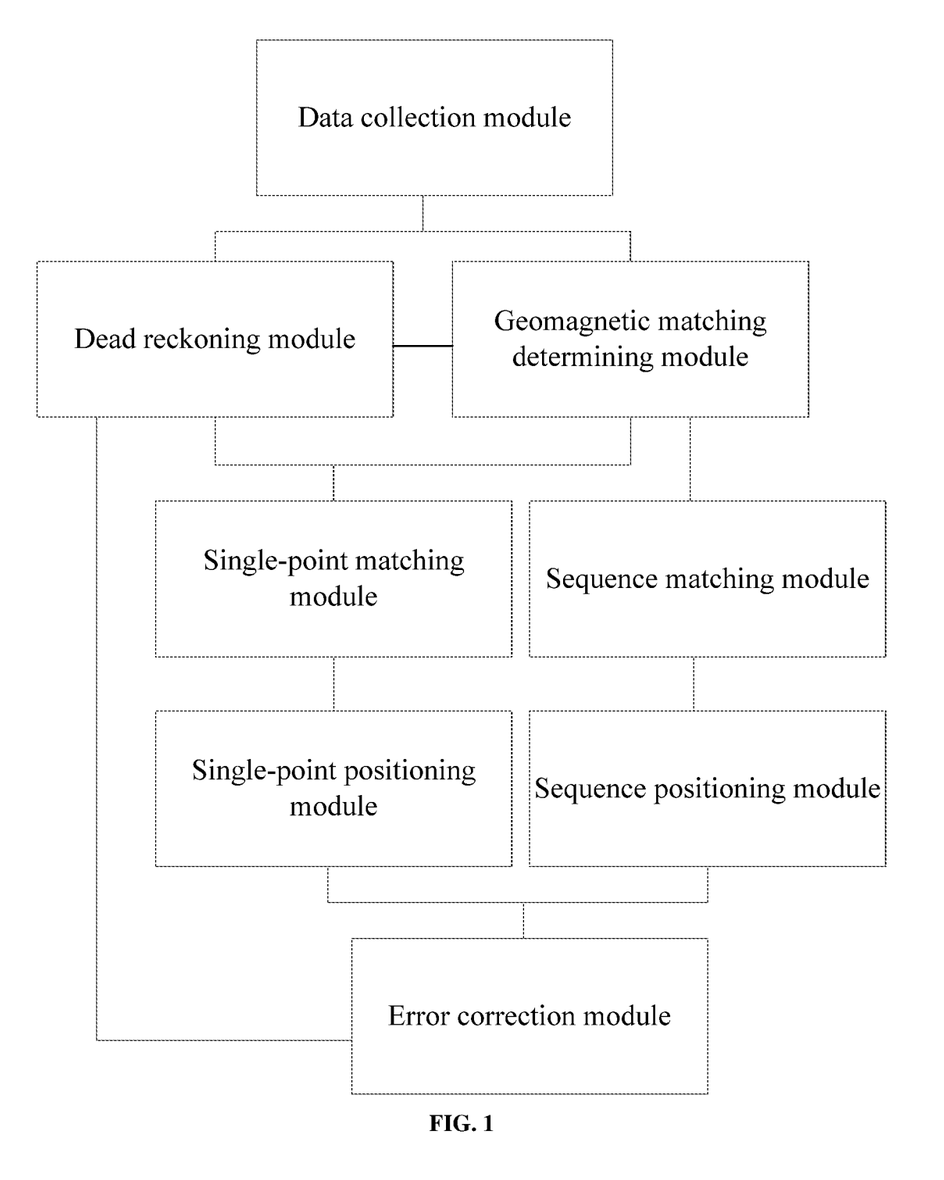
FIG. 1 is a schematic structural diagram of a passive combined indoor positioning system based on an intelligent terminal sensor according to an embodiment of the present disclosure.

As shown in FIG. 1, a passive combined indoor positioning system based on an intelligent terminal sensor in the present disclosure includes a data collection module, a dead reckoning module, a geomagnetic matching determining module, a single-point matching module, a sequence matching module, a single-point positioning module, a sequence positioning module, and an error correction module.

Specifically, the data collection module is configured to collect sensor data of a current location, where the sensor data includes geomagnetic data, angular velocity data, and acceleration data, and the current location is an indoor location of an intelligent terminal of a target user at a current time point.

The dead reckoning module is configured to detect a gait of the target user based on an acceleration peak threshold, a time threshold, and the acceleration data in the sensor data of the current location, estimate a step length of the target user based on a step length regression model at the current time point, estimate a step orientation of the target user based on the sensor data of the current location and a step orientation error at the current time point, and perform dead reckoning based on a gait detection result, a step length estimation result, and a step orientation estimation result to obtain a current dead reckoning result of the target user, where the step length regression model is constructed based on a step frequency of the target user and an acceleration inertia integration result.

The geomagnetic matching determining module is configured to determine a candidate fingerprint database based on the current dead reckoning result, and input geomagnetic data of each location in the candidate fingerprint database into a geomagnetic information abundance evaluation model, such that the geomagnetic information abundance evaluation model outputs a geomagnetic matching weight determining mode of the geomagnetic data of each particle in the candidate fingerprint database, where the geomagnetic matching weight determining mode includes single-point matching and sequence matching.

The single-point matching module is configured to determine a candidate fingerprint database based on the current dead reckoning result, and determine coordinates and a weight of each particle in the candidate fingerprint database based on the geomagnetic data in the sensor data of the current location and the geomagnetic data of each particle in the candidate fingerprint database when the geomagnetic matching weight determining mode is the single-point matching.

The sequence matching module is configured to match geomagnetic data of a current sequence segment with geomagnetic data of each fingerprint segment in a geomagnetic fingerprint database to obtain coordinates and a weight of each fingerprint segment when the geomagnetic matching weight determining mode is the sequence matching, where the current sequence segment includes magnetic data in a time period from a set time point to the current time point, the set time point is any time point before the current time point, and a length of the fingerprint segment is equal to a length of the current sequence segment.

The single-point positioning module is configured to determine a final positioning result of the current particle based on the coordinates and the weight of each particle in the candidate fingerprint database when the geomagnetic matching weight determining mode is the single-point matching.

The sequence positioning module is configured to determine the final positioning result of the current location based on the coordinates and the weight of each fingerprint segment when the geomagnetic matching weight determining mode is the sequence matching.

The error correction module is configured to correct the step length regression model and the step orientation at the current time point based on the fusion positioning result of the current location, use a corrected step length regression model as a step length regression model at a next time point, correct the step orientation error at the current time point based on a step orientation estimation result at the current time point and the step orientation estimation result back calculated based on adjacent time point fusion positioning result at the current time point, and use a corrected step orientation error as a step orientation error at the next time point.

Further, the passive combined indoor positioning system further includes a data storage module.

Specifically, the data storage module is configured to determine and store the geomagnetic information abundance evaluation model based on coordinates and geomagnetic data of each indoor location.

Further, the data storage module includes a geomagnetic fingerprint database construction unit, a region division unit, a geomagnetic information evaluation unit, and a geomagnetic map storage unit.

Specifically, the geomagnetic fingerprint database construction unit is configured to construct the geomagnetic fingerprint database based on the coordinates and the geomagnetic data of each indoor location. The region division unit is configured to divide the geomagnetic fingerprint database into a plurality of sub-regions. The geomagnetic information evaluation unit is configured to extract a five-dimensional geomagnetic feature of the sub-region and an indicator of the geomagnetic feature of each dimension, take the indicator of the five-dimensional geomagnetic feature as an input of a deep learning network, train the deep learning network by taking the corresponding geomagnetic matching weight determining mode as an output, and determine a trained deep learning network as the geomagnetic information abundance evaluation model. The geomagnetic map storage unit is configured to store the geomagnetic information abundance evaluation model and the geomagnetic fingerprint database.

Further, the dead reckoning module includes a gait detection unit, a step length estimation unit, a step orientation estimation unit, and a dead reckoning unit.

Specifically, the gait detection unit is configured to detect the gait of the target user based on the acceleration peak threshold, the time threshold, and the acceleration data in the sensor data of the current location to obtain the gait detection result of the target user. The step length estimation unit is configured to estimate the step length of the target user based on the step length regression model at the current time point to obtain the step length estimation result of the target user. The step orientation estimation unit is configured to determine a posture of the target user at the current time point based on the sensor data of the current location, and determine the step orientation estimation result of the target user based on the posture at the current time point and the step orientation error at the current time point. The dead reckoning unit is configured to perform dead reckoning based on the gait estimation result, the step length estimation result, and the step orientation estimation result to obtain the current dead reckoning result.

Further, the geomagnetic matching determining module includes a candidate fingerprint database determining unit and a matching mode determining unit.

Specifically, the candidate fingerprint database determining unit is configured to determine the candidate fingerprint database by taking the current dead reckoning result as a center and a specified radius as a constraint, where the specified radius is a multiple of the step length estimation result. The matching mode determining unit is configured to input the geomagnetic data of each location in the candidate fingerprint database into the geomagnetic information abundance evaluation model, such that the geomagnetic information abundance evaluation model outputs the geomagnetic matching weight determining mode of the geomagnetic data of each particle in the candidate fingerprint database.

Further, the sequence matching module includes a sequence composition unit and a sequence geomagnetic matching unit.

Specifically, the sequence composition unit is configured to extract a plurality of single point fingerprints to form a sequence fingerprint from the geomagnetic fingerprint database based on the length of the current sequence segment. The sequence geomagnetic matching unit is configured to perform similarity matching on the geomagnetic data of the current sequence segment and the geomagnetic data of each fingerprint segment to obtain the coordinates and the weight of each fingerprint segment.

Further, the single-point positioning module includes a single-point weight resampling unit and a single-point positioning combination unit.

Specifically, the single-point weight resampling unit is configured to perform clustering and rationality verification on the weight of each particle in the candidate fingerprint database, and resample a weight and corresponding coordinates of each particle obtained after the clustering and rationality verification in a candidate fingerprint database to obtain a first type of resampled data. The single-point positioning combination unit is configured to perform weighted averaging on the first type of resampled data to obtain the final positioning result of the current location.

Further, the sequence positioning module includes a sequence weight resampling unit and a sequence positioning combination unit.

The sequence weight resampling unit is configured to perform clustering and rationality verification on the weight of each fingerprint segment, and resample a weight and corresponding coordinates of each fingerprint segment obtained after the clustering and rationality verification to obtain a second type of resampled data. The sequence positioning combination unit is configured to perform weighted averaging on the second type of resampled data to obtain the final positioning result of the current location.

Figure 2:
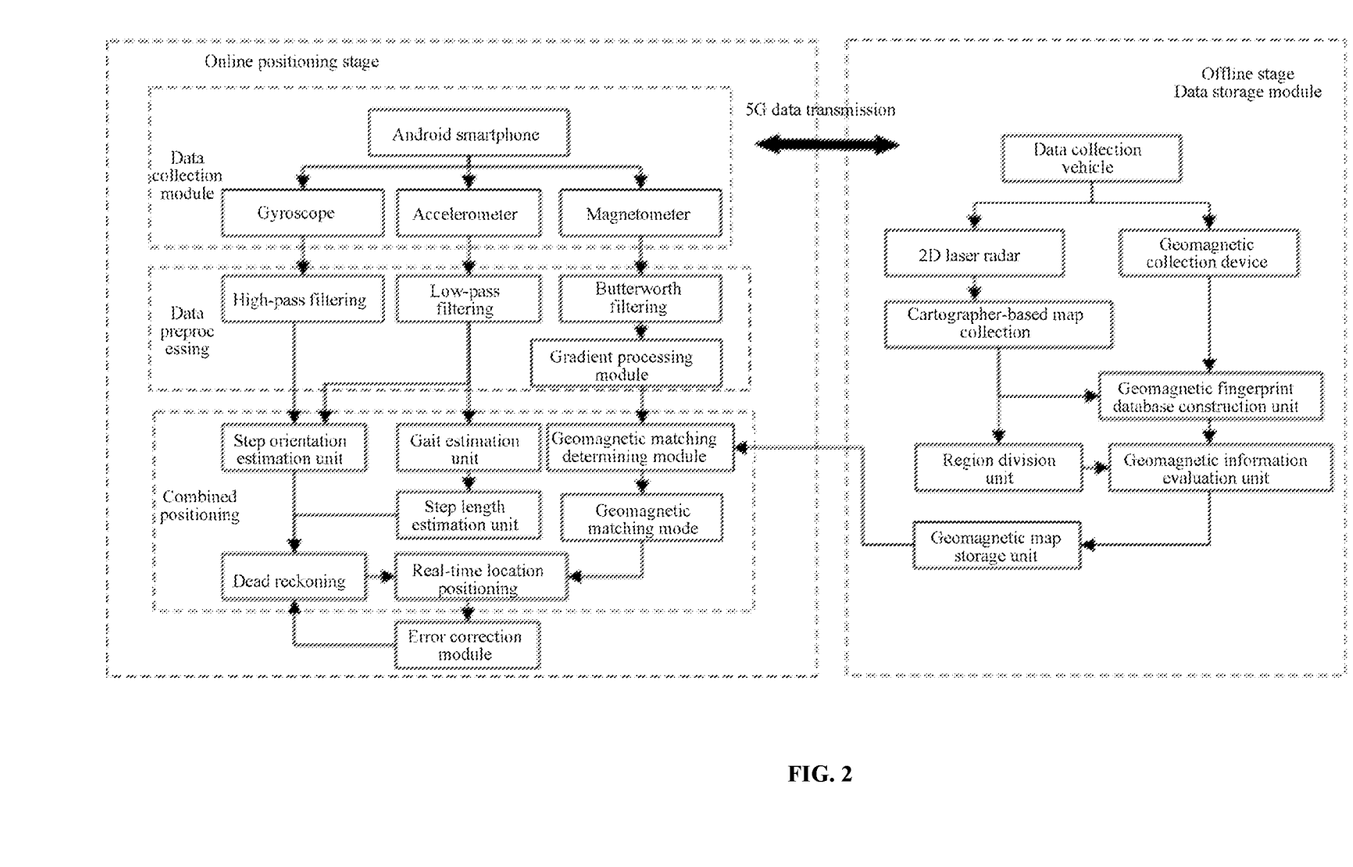
FIG. 2 is a flowchart of data preprocessing of a passive combined indoor positioning system based on an intelligent terminal sensor according to an embodiment of the present disclosure.

In this embodiment, the data collection module, the dead reckoning module, the geomagnetic matching determining module, the single-point matching module, the sequence matching module, the single-point positioning module, the sequence positioning module, and the error correction module are taken as an online positioning stage, and the data storage module is taken as an offline stage. The offline stage should be completed before the online positioning stage, such that data can be read when geomagnetic matching is determined in the online positioning stage. Data transmission can be performed between the offline stage and the online positioning stage through 5G, as shown in FIG. 2. A mobile phone is used as the intelligent terminal in this embodiment, but this embodiment is not limited to this. The intelligent terminal may be another device based on a specific situation in practical application.

In the geomagnetic fingerprint database construction unit in the offline stage, firstly, indoor geomagnetic map data of a positioned indoor region is obtained by using a data collection vehicle. The data collection vehicle integrates a two-dimensional laser scanner and a geomagnetic collection device. Secondly, a cartographer scheme is used to generate an indoor two-dimensional plan based on the indoor geomagnetic map data, and then a simultaneous localization and mapping (SLAM) technology of a laser radar is used to perform positioning again and collect three-axis geomagnetic information of a location in the region to construct the geomagnetic fingerprint database.

The indoor geomagnetic map data includes the following two parts:
1) coordinates of each known indoor location: grid coordinates of a fingerprint point under a two-dimensional local coordinate system; and
2) geomagnetic data corresponding to each known indoor location: geomagnetic feature gradient of a fingerprint point under a local horizontal coordinate system, where geomagnetic feature components include an eastern direction, a northern direction, a horizontal direction, a vertical direction, and a modulus value.

In the offline stage, the region division unit divides the geomagnetic fingerprint database into a plurality of square sub-regions. A side length of the sub-region should be greater than a length of one step to facilitate operation of the geomagnetic information evaluation unit.

In the offline stage, the five-dimensional geomagnetic feature extracted by the geomagnetic information evaluation unit for the sub-region includes an eastern geomagnetic component, a northern geomagnetic component, a horizontal geomagnetic component, a vertical geomagnetic component, and a modulus value component. Extracted indicators of the geomagnetic feature of the sub-region include a geomagnetic gradient, a geomagnetic entropy, and a uniformity coefficient. For the geomagnetic entropy, an information entropy calculation formula is introduced, namely, $h=-\Sigma(p_i*\ln p_i)$. The uniformity coefficient is calculated using a Pielou indicator according to a formula $JSW=-\Sigma(p_i*\ln p_i)/\ln n$, where $p_i$ represents a frequency of a value of the geomagnetic feature in a geomagnetic fingerprint database of the sub-region, and n represents a quantity of all possible values of the geomagnetic feature in the geomagnetic fingerprint database of the sub-region.

When the deep learning network is constructed, the five-dimensional geomagnetic feature of the sub-region is extracted, and an average geomagnetic gradient, geomagnetic entropy, and uniformity coefficient are calculated for the geomagnetic feature of each dimension to form a 15-dimensional input of the deep learning network. An output of the deep learning network is a two-dimensional matrix. The matrix stores a label indicating whether to adopt the single-point geomagnetic matching and the sequence geomagnetic matching, where 0 represents that the single-point geomagnetic matching and the sequence geomagnetic matching are not used, 1 indicates that the single-point geomagnetic matching and the sequence geomagnetic matching are used, and 0 and 1 must appear simultaneously in the result.

During labeling, geomagnetic data of a known reference location is used to perform the single-point matching and the sequence matching, errors of the two positioning modes are calculated separately. The mode with a smaller error after comparison is labeled as 1, and the mode with a larger error is labeled as 0. If the single-point matching can be performed in the sub-region, it indicates that the point has rich geomagnetic information, and a high-precision location result can be obtained with no sequence needed.

Figure 3:
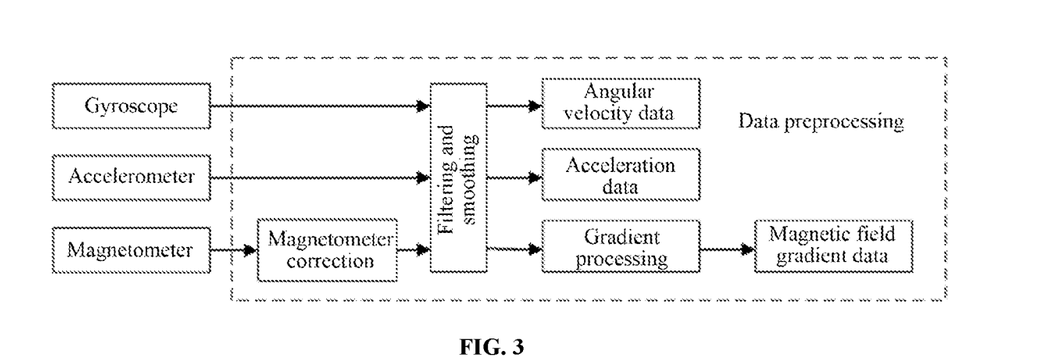
FIG. 3 is a schematic diagram of data preprocessing of a passive combined indoor positioning system based on an intelligent terminal sensor according to an embodiment of the present disclosure.

In the online positioning stage, the data collection module collects the sensor data based on a three-axis magnetometer, a three-axis gyroscope, and a three-axis accelerometer of the mobile phone, and pre-processes the sensor data, as shown in FIG. 3.

Specifically, a hard magnetic distortion and a soft magnetic distortion of the magnetometer are corrected. The hard magnetic distortion is caused by hard magnetic materials such as a battery and a microphone, which causes a deviation of measured data of the magnetometer. The soft magnetic distortion makes magnetic field data measured by the magnetometer at a fixed point no longer be a sphere. A measured value of the magnetometer is expressed as $\hat{H}_t^b = S_t H_t^b + B_t + \varepsilon_t$, where t represents an observation time point, b represents a body system, $\hat{H}_t^b$ represents the measured value of the magnetometer, $S_t$ represents the soft magnetic distortion, $H_b$ represents real geomagnetic intensity of the point, $B_t$ represents the hard magnetic distortion, and $\varepsilon_t$ represents measurement noise.

A magnetic field measured by the magnetometer at the fixed point is a sphere passing through an origin. A distance from a far point in a spheroid and a parameter for conversion between the spheroid and the sphere can be estimated by using a least square method, where the former is the hard magnetic distortion, and the latter is the soft magnetic distortion. Hard magnetic correction and soft magnetic correction are performed according to a formula $\tilde{H}_t^b = S_t^{-1} H_t^b - S_t^{-1} B_t$. However, due to the measurement noise, $H_t^b$ cannot be obtained accurately, and approximate geomagnetic intensity $\tilde{H}_t^b$ is obtained.

Butterworth filtering and denoising and gradient processing are performed on data collected by the magnetometer to obtain geomagnetic data (namely, magnetic field gradient data). High-pass filtering and denoising are performed on gyroscope data to obtain the angular velocity data, and low-pass filtering and denoising are performed on accelerometer data to obtain the acceleration data. A gradient processing module performs a subtraction on a magnetic field measurement of the collected geomagnetic data and a magnetic field measurement of any designated point in the fingerprint database, and processes a geomagnetic intensity value into a gradient value, where the designated point should be consistent with a point selected when the geomagnetic fingerprint database is constructed.

In the online positioning stage, before the dead reckoning module, an initialization module is further included. The initialization module only exists before a first gait, and is configured to provide an indoor location as an initial location of dead reckoning, and determine an initialized region by taking the initial location as a center. In the initialized region, 200 particles are set, and the particles are randomly and evenly distributed in a square with three times the step length as the side length and equal weights. Then, the particles would fall into the candidate fingerprint database.

Figure 4:
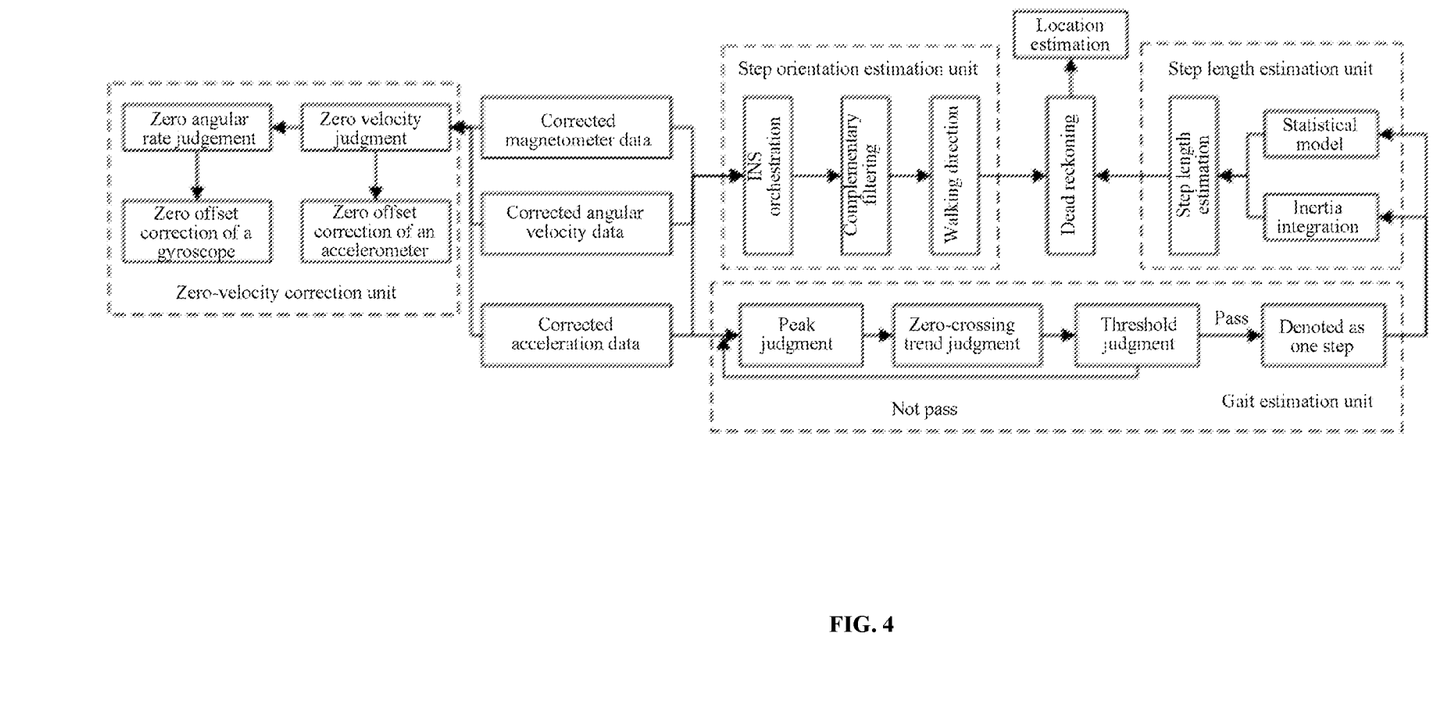
FIG. 4 is a schematic diagram of a dead reckoning module of a passive combined indoor positioning system based on an intelligent terminal sensor according to an embodiment of the present disclosure.

In the online positioning stage, the gait estimation unit performs peak judgment and trend judgment based on the acceleration peak threshold, the time threshold, and the acceleration data in the sensor data of the current location. When a threshold requirement is satisfied, the gait estimation result is recorded as one step, as shown in FIG. 4.

The peak judgment specifically includes the following operations:

a time point when the first gait occurs is searched for, data in the first 8 s is intercepted from corrected acceleration data, a location of a peak is recorded, and a neighborhood standard deviation of the location is calculated. If the standard deviation is greater than 0.5, one step may be walked and a candidate region is entered. A neighborhood size is related to a sensor data collection frequency, and a time span is slightly greater than time required for walking one step.

For a peak entering the candidate region, whether there is a complete trend that the acceleration data is less than 9.8 m/s$^2$ (the local gravity acceleration) and less than 9.8 m/s$^2$ after reaching the peak is determined in a corresponding neighborhood, a first time point when an acceleration is from less than 9.8 m/s$^2$ to more than 9.8 m/s$^2$ and a first time point when the acceleration is from more than 9.8 m/s$^2$ to less than 9.8 m/s$^2$ are recorded, whether a time difference is half of the time of one step is determined, and start and end time points of the gait are recorded.

Whether a difference between start and end time points within one step is within the time range of one step is determined. Generally, the time required for one step is within a range of 0.2 s to 2 s. If the difference between the start and end time points, and the start and end time points between the adjacent gaits meet the requirement for the time of one step, it is indicated that the first gait occurs, and its start and end time points are recorded. Otherwise, a next peak in candidate region is continuously searched for.

The threshold judgment specifically includes the following operations:

for the second and subsequent gaits, in addition to the above judgment, interval judgment is also required for a time difference of an adjacent gait. Both the start and end time points within one step and the difference between start and end time points of the adjacent gait should be statistically within the time of one step. If the condition is met, it is confirmed that a quantity of gaits is increased by 1. Otherwise, acceleration data at the following time point after the end time point of a first step is processed and the peak data is moved out of the candidate region.

In the online positioning stage, the step length estimation unit determines the step length regression model based on the step frequency of the target user and the acceleration inertia integration result. The step length regression model is designed to avoid a positioning error caused by insufficient robustness of a step length model due to a building environment, an obstacle, or an emergency.

The step length regression model is length=$\alpha*f+ b*\int acc \cdot dt$. In the above formula, length represents the step length estimation result, which is determined based on a fusion positioning result in the first two steps; both a and b are coefficients, which are estimated by using the least square method based on information in the first two steps of a current gait; f represents the step frequency; and $\int facc \cdot dt$ represents an integration result of the accelerometer within a time interval of the current gait.

In the online positioning stage, the step orientation estimation unit updates angles of the gyroscope by means of inertial navigation system (INS) mechanization, and performs complementary filtering based on the magnetometer and accelerometer data to correct a yaw, so as to determine the step orientation estimation result of the target user, as shown in FIG. 4. Specifically:

At the beginning of positioning, filtered and smoothed magnetometer data and accelerometer data are used to estimate the posture of the target user at the current time point, a quaternion is used to represent a direction cosine matrix for mechanization $C_{b,k}^n = C_{b,k-1}^n [I + \Delta\theta_k^b \times]$, and the INS mechanization is performed on the step orientation, where n represents a navigation system, namely, the local horizontal coordinate system, $C_{b,k}^n$ represents a direction cosine matrix from the b system to the n system at a time point k, I represents a unit matrix, $\Delta\theta_k^b$ represents an angular increment measured by the gyroscope under the b system at the time point k, and "x" represents an antisymmetric symbol. A relationship between the quaternion and a rotation matrix is as follows:

$$C_{b,k}^n = \begin{bmatrix} q_o^2 + q_1^2 - q_2^2 - q_3^2 & 2(q_1q_2 - q_0q_3) & 2(q_0q_2 + q_1q_3) \\ 2(q_0q_3 + q_1q_2) & q_0^2 - q_1^2 + q_2^2 - q_3^2 & 2(q_2q_3 - q_0q_1) \\ 2(q_1q_3 - q_0q_2) & 2(q_0q_1 + q_2q_3) & q_0^2 - q_1^2 - q_2^2 + q_3^2 \end{bmatrix}$$

A posture of the mobile phone is estimated, and the gyroscope, accelerometer, and magnetometer measurement is converted into data under the local horizontal coordinate system. In order to avoid an Euler angle deadlock in a universal joint, the posture is expressed by the quaternion, where q represents a four-dimensional hypercomplex number, q represents a real part, indicating a rotation angle, and $q_2$ to $q_4$ represent imaginary parts, which together form a rotation axis.

High-pass filtering is performed on the gyroscope data, a quaternion representation $\hat{q}$ of the current posture is estimated, low-pass filtering is performed on the accelerometer and magnetometer, and the gyroscope is calibrated:

$$q = \frac{1}{2}\hat{q} \otimes P(\hat{\omega} + \hat{\delta}),$$

where q represents a corrected quaternion representation, P represents a mapping from a three-dimensional vector to the quaternion, and $\hat{\omega}$ represents an angular velocity vector obtained by the gyroscope.

$\delta$ represents a gyroscope compensation value generated by a proportional integral (PI) controller, namely, $\delta = K_p \cdot e + K_I \cdot \int e dt$. In the PI controller, the parameter $K_P$ is used to control a cross frequency between the accelerometer, the magnetometer, and the gyroscope, and the parameter $K_I$ is used to correct an error of the gyroscope.

e represents a relative rotation between a measured inertia vector and a predicted vector, namely, $e = \bar{v} \times \hat{v}$.

After the quaternion at the current time point is estimated, the Euler angle is back calculated to estimate the posture of the mobile phone as follows:

$$\begin{bmatrix} \theta \\ \gamma \\ \varphi \end{bmatrix} = \begin{bmatrix} \arctan\left(2q_2q_3 + 2q_0q_1 / q_3^2 - q_2^2 - q_1^2 + q_0^2\right) \\ -\arcsin\left(2q_1q_3 - 2q_0q_2\right) \\ \arctan\left(2q_1q_2 + 2q_0q_3 / q_1^2 + q_0^2 - q_3^2 - q_2^2\right) \end{bmatrix}$$

where $\theta$, $\gamma$, $\varphi$ represent a pitch angle, a roll angle, and a yaw angle respectively.

In the online positioning stage, the dead reckoning module further includes a zero-velocity correction unit. The zero-velocity correction unit is configured to correct a sensor error of the intelligent terminal of the target user based on the sensor data of the current location, as shown in FIG. 4. Specifically:

Whether a velocity is zero is determined based on acceleration data in the last 3 s. If the velocity is zero, a reading of the accelerometer is a zero offset. If the velocity is not zero, whether a subsequent velocity is equal to zero is continuously determined. On a basis that the velocity is zero, whether there is a posture change is determined by using the magnetometer and the gyroscope. If there is no posture change, a measured value of the three-axis gyroscope is the zero offset.

Specifically, when the zero velocity is determined, whether a measured value of the three-axis accelerometer is approximately equal to a gravity acceleration is determined first, and then whether an acceleration in a vertical direction accounts for more than 95% of the acceleration is determined. If the measured value of the three-axis accelerometer is approximately equal to the gravity acceleration, and the acceleration in the vertical direction accounts for more than 95% of the acceleration, it indicates that a zero-velocity state is available.

A posture angle change is obtained by reading the gyroscope and the magnetometer measurement of the mobile phone. If a posture angle and a reading of the gyroscope do not change significantly at this time, it is determined that zero angular rate update occurs.

Figure 5:
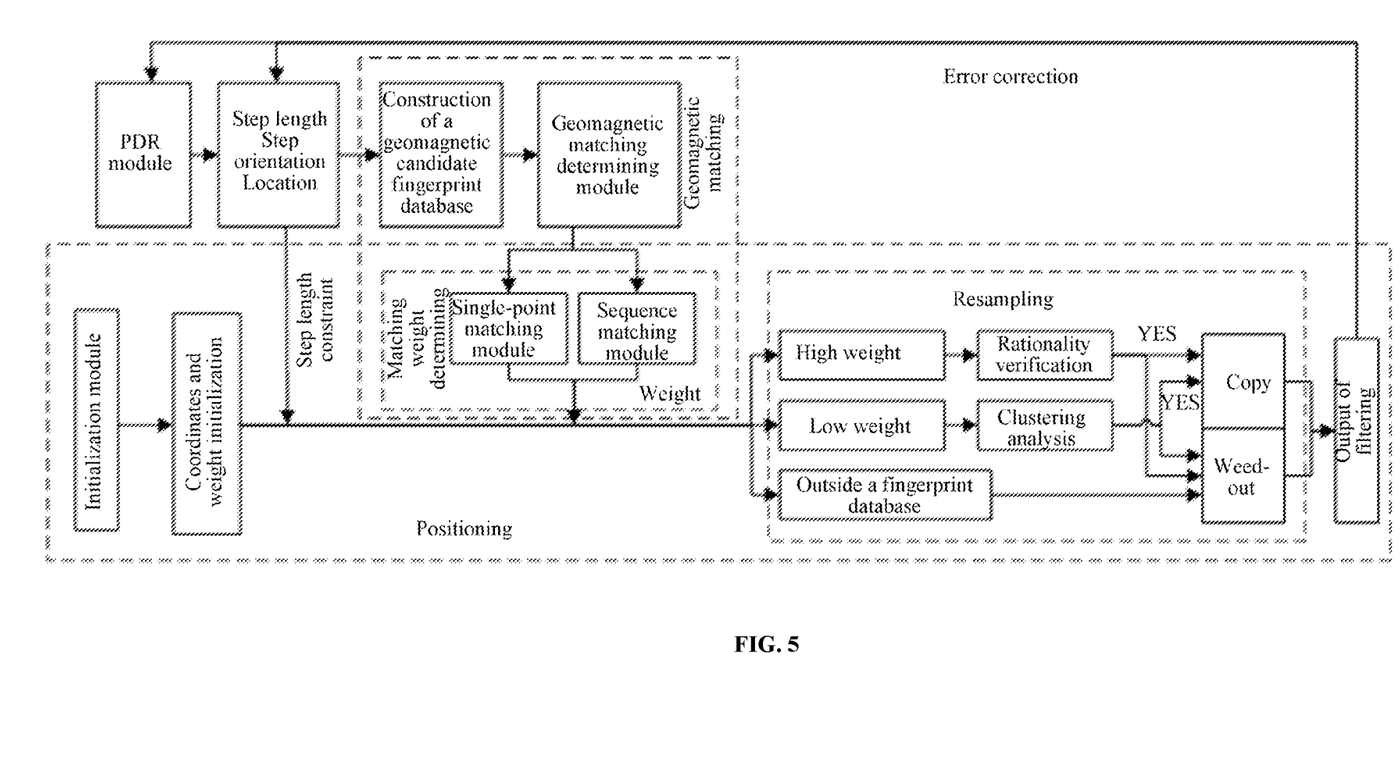
FIG. 5 is a schematic diagram of single-point positioning and sequence positioning of a passive combined indoor positioning system based on an intelligent terminal sensor according to an embodiment of the present disclosure.

In the online positioning stage, the geomagnetic matching determining module firstly shrinks the candidate fingerprint database based on the step length. Generally, a geomagnetic feature variance in each dimension in a region that takes an estimated location obtained through the PDR as a center and one step length as a radius range is calculated. A larger variance leads to a higher weight corresponding to the component. Whether the geomagnetic data in the sensor data of the current location is enough to form a geomagnetic sequence is determined based on the candidate fingerprint database and the geomagnetic information abundance evaluation model. If the geomagnetic sequence can be formed, the sequence matching is performed; if the geomagnetic sequence cannot be formed, the single-point matching is performed. If the geomagnetic data in the sensor data of the current location point can form the geomagnetic sequence, a gradient, abundance, and a uniformity coefficient of a nearby region (a size of the nearby region is consistent with that of the sub-region) are extracted and input into the deep learning network to determine whether to select the single-point matching mode or the sequence matching mode, as shown in FIG. 5. In addition, the candidate fingerprint database is changing based on the current dead reckoning result, and starts to change once a gait is detected.

In the single-point matching module in the online positioning stage, a weighted matching method based on the geomagnetic feature variance is adopted. Under the geomagnetic feature of each dimension, geomagnetic intensity of three fingerprint points closest to a predicated location of a particle is calculated for averaging. The coordinates and the weight of each particle in the candidate fingerprint database can be obtained by calculating a Euclidean distance between observed values and expressing the Euclidean distance by using a normal distribution formula. That is, the similarity matching is performed on a five-dimensional geomagnetic feature of the geomagnetic data in the sensor data of the current location and a five-dimensional geomagnetic feature of the geomagnetic data of each particle in the candidate fingerprint database to obtain the coordinates and the weight of each particle in the candidate fingerprint database, as shown in FIG. 5.

In the online positioning stage, the sequence matching module uses a dynamic time warping (DTW) algorithm to align the length of the current sequence segment with the length of each fingerprint segment in the geomagnetic fingerprint database, and determines the coordinates and the weight of each fingerprint segment based on a similarity of the DTW algorithm, as shown in FIG. 5.

The DTW algorithm specifically includes:
first calculating $$d(i, j) = \sqrt{\sum_{k=1}^{3}(M(k, i) - m(k, j))^2},$$

where k represents a dimension of a geomagnetic measurement, and d(i,j) represents a distance between an $i^{th}$ element in a fingerprint segment of the geomagnetic fingerprint database and a $j^{th}$ element in the current sequence segment; and then calculating an accumulative path distance D(i,j)=d(i,j)+min{D(i−1,j),D(i,j−1),D(i−1,j−1)} where a smaller value of D(i,j) means a higher similarity of the geomagnetic sequence and a greater particle weight.

In the online positioning stage, both the single-point positioning module and the sequence positioning module first need to perform clustering analysis and rationality verification on a result after geomagnetic matching (in other words, the coordinates and the weight of each particle in the candidate fingerprint database or the coordinates and the weight of each fingerprint segment), and then perform resampling based on a result after the clustering analysis and the rationality verification, to obtain resampled data (in other words, the first type of resampled data or the second type of resampled data), as shown in FIG. 5.

The above process specifically includes: performing the rationality verification on a high-weight particle, copying a particle passing the verification, selectively weeding out a low-weight particle, eliminating a particle beyond a range of the geomagnetic fingerprint database, and resampling a single-point matching result (namely, the coordinates and the weight of each particle in the candidate fingerprint database) or a sequence matching result (namely, the coordinates and the weight of each fingerprint segment) obtained after the above screening process, to ensure that there are 200 resampled particles. A random resampling method is used to copy the high-weight particle and selectively weed out the low-weight particle.

The rationality verification is performed based on a continuous walking state, specifically including: calculating a distance between the high-weight particle and the current dead reckoning result of the target user, and determining that mismatching is performed if the distance between the high-weight particle and the current dead reckoning result of the target user is greater than one step; and using a step orientation and a step length of the current gait to trace back the particle, calculating a distance between a location of the particle and a location of the particle at the previous time point, and determining that a weight of the particle should be reduced if the distance between the location of the particle and a fusion positioning result at the previous time point is large.

Weighted averaging is performed on resampled data obtained after the above steps to obtain the final positioning result of the current location.

In the online positioning stage, the error correction module corrects, based on a positioning result at the current and the previous time point, a parameter of the step length regression model in the step length estimation, and then corrects a dead reckoning result at the next time point. Specifically, the step length and the step orientation are obtained based on a positioning result at an adjacent time point:

$$\begin{cases} \text{step\_length} = \sqrt{(X_k - X_{k-1})^2 + (Y_k - Y_{k-1})^2} \\ \text{step\_orientation} = \arctan((Y_k - Y_{k-1})/(X_k - X_{k-1})) \end{cases}$$

where step_Length and step_orientation respectively represent the step length and the step orientation, k represents the observation time point, and (X, Y) represents a pedestrian's two-dimensional position integrating positioning results.

Figure 6:
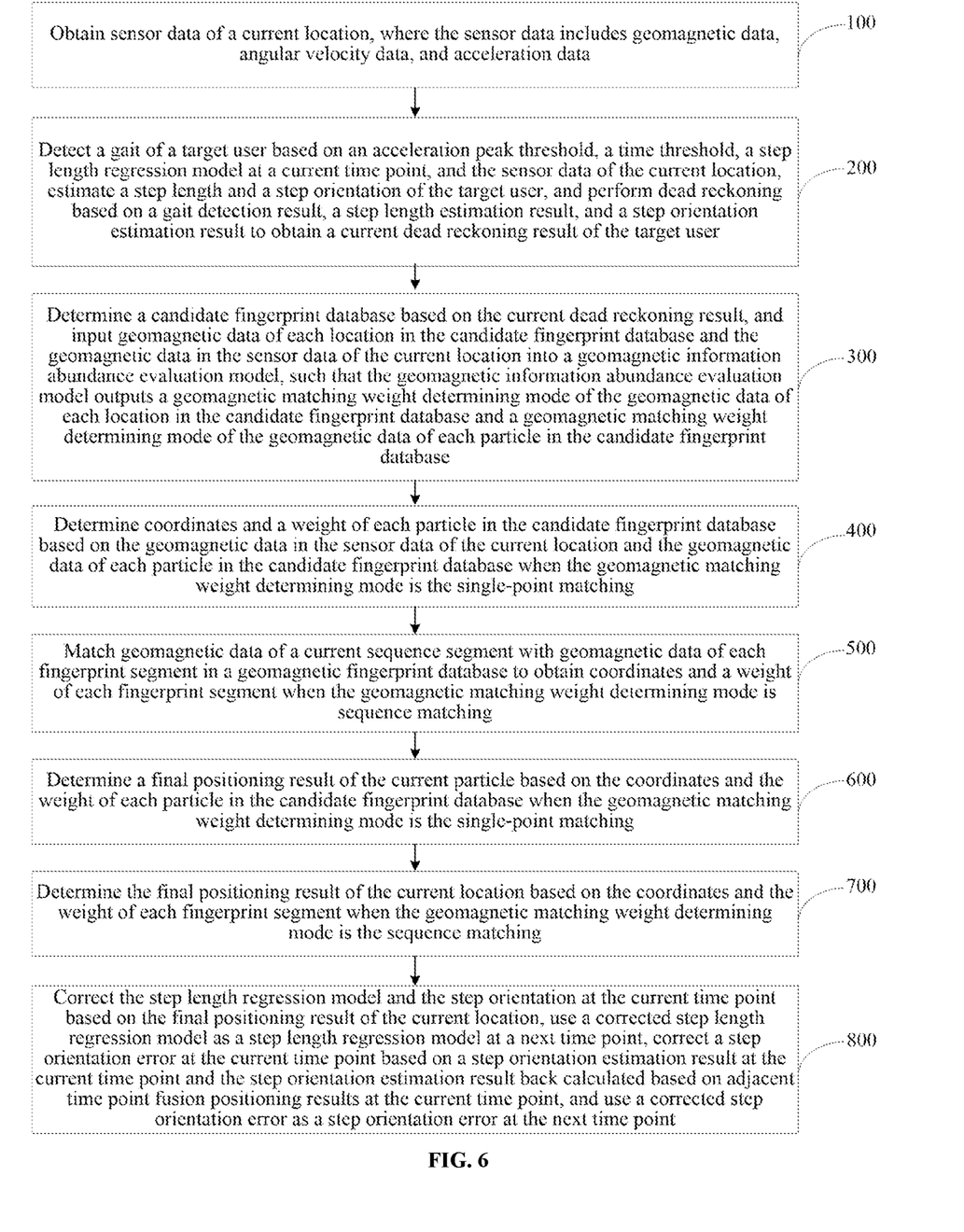
FIG. 6 is a schematic flowchart of a passive combined indoor positioning method based on an intelligent terminal sensor according to an embodiment of the present disclosure.

As shown in FIG. 6, a passive combined indoor positioning method based on an intelligent terminal sensor according to the present disclosure includes the following steps:

Step 100: Obtain sensor data of a current location, where the sensor data includes geomagnetic data, angular velocity data, and acceleration data, and the current location is an indoor location of an intelligent terminal of a target user at a current time point.

Step 200: Detect a gait of the target user based on an acceleration peak threshold a time threshold, a step length regression model at the current time point, and the sensor data of the current location, estimate a step length and a step orientation of the target user, and perform dead reckoning based on a gait detection result, a step length estimation result, and a step orientation estimation result to obtain a current dead reckoning result of the target user, where the step length regression model is constructed based on a step frequency of the target user and an acceleration inertia integration result.

Step 300: Determine a candidate fingerprint database based on the current dead reckoning result, and input geomagnetic data of each location in the candidate fingerprint database into a geomagnetic information abundance evaluation model, such that the geomagnetic information abundance evaluation model outputs a geomagnetic matching weight determining mode of the geomagnetic data of each particle in the candidate fingerprint database and a geomagnetic matching weight determining mode of the geomagnetic data in the sensor data of the current location, where the geomagnetic matching weight determining mode includes single-point matching and sequence matching.

Step 400: Determine coordinates and a weight of each particle in the candidate fingerprint database based on the geomagnetic data in the sensor data of the current location and the geomagnetic data of each particle in the candidate fingerprint database when the geomagnetic matching weight determining mode is the single-point matching.

Step 500: Match geomagnetic data of a current sequence segment with geomagnetic data of each fingerprint segment in a geomagnetic fingerprint database to obtain coordinates and a weight of each fingerprint segment when the geomagnetic matching weight determining mode is the sequence matching, where the current sequence segment includes magnetic data in a time period from a set time point to the current time point, the set time point is any time point before the current time point, and a length of the fingerprint segment is equal to a length of the current sequence segment.

Step 600: Determine a final positioning result of the current particle based on the coordinates and the weight of each particle in the candidate fingerprint database when the geomagnetic matching weight determining mode is the single-point matching.

Step 700: Determine the final positioning result of the current location based on the coordinates and the weight of each fingerprint segment when the geomagnetic matching weight determining mode is the sequence matching.

Step 800: Correct the step length regression model and the step orientation at the current time point based on the final positioning result of the current location, use a corrected step length regression model as a step length regression model at a next time point, correct a step orientation error at the current time point based on a step orientation estimation result at the current time point and the step orientation estimation result back calculated based on adjacent time point fusion positioning results at the current time point, and use a corrected step orientation error as a step orientation error at the next time point.

Further, the passive combined indoor positioning method further includes:

determining and storing the geomagnetic information abundance evaluation model based on coordinates and geomagnetic data of each indoor location.

Each embodiment of the present specification is described in a progressive manner, each embodiment focuses on the difference from other embodiments, and the same and similar parts between the embodiments may refer to each other. Since the system disclosed in an embodiment corresponds to the method disclosed in another embodiment, the description is relatively simple, and reference can be made to the method description.

Specific examples are used herein to explain the principles and implementations of the present disclosure. The foregoing description of the embodiments is merely intended to help understand the method of the present disclosure and its core ideas; besides, various modifications may be made by a person of ordinary skill in the art to specific embodiments and the scope of application in accordance with the ideas of the present disclosure. In conclusion, the content of the present specification shall not be construed as limitations to the present disclosure.

What is claimed is:

1. A passive combined indoor positioning method based on an intelligent terminal sensor, comprising:

obtaining sensor data of a current location, wherein the sensor data comprises geomagnetic data, angular velocity data, and acceleration data, and the current location is an indoor location of an intelligent terminal of a target user at a current time point;

detecting a gait of the target user based on an acceleration peak threshold, a time threshold, a step length regression model at the current time point, and the sensor data of the current location, estimating a step length and a step orientation of the target user, and performing dead reckoning based on a gait detection result, a step length estimation result, and a step orientation estimation result to obtain a current dead reckoning result of the target user, wherein the step length regression model is constructed based on a step frequency of the target user and an acceleration inertia integration result;

determining a candidate fingerprint database based on the current dead reckoning result, and inputting geomagnetic data of each location in the candidate fingerprint database and the geomagnetic data in the sensor data of the current location into a geomagnetic information abundance evaluation model, such that the geomagnetic information abundance evaluation model outputs a geomagnetic matching weight determining mode of the geomagnetic data of each particle in the candidate fingerprint database and a geomagnetic matching weight determining mode of the geomagnetic data in the sensor data of the current location, wherein the geomagnetic matching weight determining mode comprises single-point matching and sequence matching;

determining coordinates and a weight of each particle in the candidate fingerprint database based on the geomagnetic data in the sensor data of the current location and the geomagnetic data of each particle in the candidate fingerprint database when the geomagnetic matching weight determining mode is the single-point matching;

matching geomagnetic data of a current sequence segment with geomagnetic data of each fingerprint segment in a geomagnetic fingerprint database to obtain coordinates and a weight of each fingerprint segment when the geomagnetic matching weight determining mode is the sequence matching, wherein the current sequence segment comprises magnetic data in a time period from a set time point to the current time point, the set time point is any time point before the current time point, and a length of the fingerprint segment is equal to a length of the current sequence segment;

determining a final positioning result of the current particle based on the coordinates and the weight of each particle in the candidate fingerprint database when the geomagnetic matching weight determining mode is the single-point matching;

determining the final positioning result of the current location based on the coordinates and the weight of each fingerprint segment when the geomagnetic matching weight determining mode is the sequence matching; and correcting the step length regression model and the step orientation at the current time point based on the final positioning result of the current location, using a corrected step length regression model as a step length regression model at a next time point, correcting a step orientation error at the current time point based on a step orientation estimation result at the current time point and the step orientation estimation result back calculated based on adjacent time point fusion positioning results at the current time point, and using a corrected step orientation error as a step orientation error at the next time point.

2. The passive combined indoor positioning method based on an intelligent terminal sensor according to claim 1, further comprising:

determining and storing the geomagnetic information abundance evaluation model based on coordinates and geomagnetic data of each indoor location.

* * * * *